May 21, 1940.   F. E. CULBERTSON   2,201,307
ANIMAL TRAP
Filed Feb. 1, 1939

Frank E. Culbertson
INVENTOR
BY Victor J. Evans & Co.
ATTORNEYS

Patented May 21, 1940

2,201,307

UNITED STATES PATENT OFFICE 2,201,307

ANIMAL TRAP

Frank E. Culbertson, Uniontown, Kans.

Application February 1, 1939, Serial No. 254,090

3 Claims. (Cl. 43—88)

My invention relates to improvements in animal traps.

An important object of my invention is the provision of a trap having a spring base that is adapted to support both jaws and to actuate the same simultaneously.

Another object of my invention is the provision of an animal trap having an operating treadle formed to simulate a natural object.

Yet another object of my invention is the provision of an animal trap that is simple in construction, efficient in operation and inexpensive to manufacture.

Other objects and advantages of my invention will be apparent during the course of the following description.

In the accompanying drawing, forming a part of this specification, and in which like numerals are employed to designate like parts throughout the same:

Figure 1:
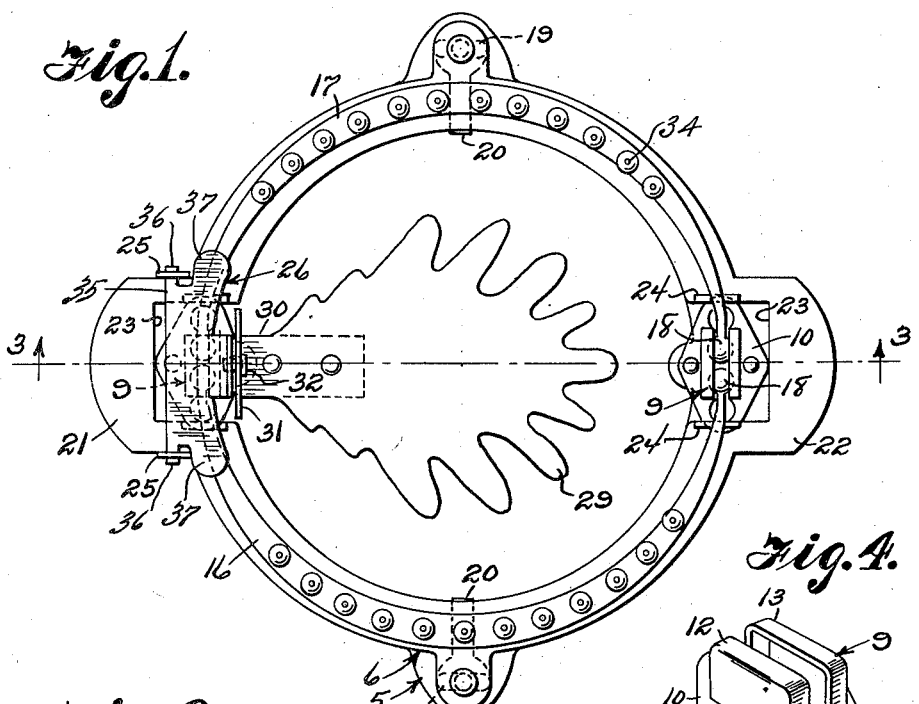
Figure 1 is a plan view of a device embodying my invention.
Figure 4:
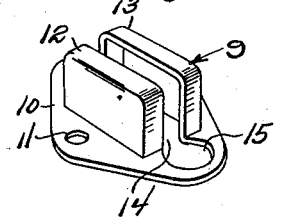
Figure 4 is a perspective view of the jaw-holding bracket, embodying a part of my invention.

In the accompanying drawing, wherein for the purpose of illustration is shown a preferred embodiment of my invention, the numeral 5 designates a substantially ring-shaped leaf spring which comprises the bottom spring of companion leaf springs 5 and 6. The lower spring 5 is formed with diametrically opposed flanges 7 and 8 which support the jaw receiving brackets 9. The brackets 9 are formed with a substantially flat base 10 having openings 11 at either side thereof to permit the same to be riveted or otherwise secured to the plate 10. Box-like shells 12 and 13 are formed on the plate in spaced parallel relation and with the open sides thereof facing each other. The plate 10 is provided with a longitudinal recess 14 interiorly of the shells 12 and 13 which terminates at one end exteriorly of the said shells in an enlarged circular portion 15.

Arcuate jaws 16 and 17 are formed at either extremity thereof with enlarged spherical tips 18 positioned between the shells 12 and 13. The tips 18 are inserted through the enlarged opening 15 of the slot 14 and are readily accommodated between the shells, but are securely held against vertical displacement.

The upper plate 6 is attached to the lower plate 5 by means of eye bolts 19, and spacers 20 are interposed between the plates to maintain the same in a slightly spaced relation to each other when the trap is set. The plate 6 is similarly provided with diametrically opposed flanges 21 and 22 which are recessed, as at 23, to accommodate the brackets 9. Either side of the recesses 23 are formed with vertically extending tabs 24 which support the jaws when the spring plates 5 and 6 are sprung to the parallel or set position illustrated in Figure 3. The trigger 26 is fashioned with an elongated base plate 35 one side of which is provided with a right angularly disposed flange 38, said base being formed adjacent the side thereof remote from the flange 38 with laterally extending lugs 36 pivotally received in horizontally aligning openings in the vertical tabs 25 formed on the flange 21. Spring arms 37 extend laterally of the plate forwardly of the lugs 36 and the free ends thereof resiliently engage the upper edge of the jaws 16 and 17 to hold the same pressed against the tabs 24, as clearly shown in Figure 1. The inner periphery of the lower plate 5 is provided with an upwardly turned flange 27 which has pivotally attached thereto one end of the plate 28 which is riveted or otherwise secured to the treadle 29. The treadle 29 is formed to simulate a natural object, here illustrated as a leaf, to disguise the function of the same and to make the action of the trap more effective. The end 30 of the treadle is formed with a verticaly disposed flange 31 carrying an outwardly extending pin 32 which is adapted to engage the aligning opening 33 in the flange 38 of the trigger. The jaws 16 and 17 have a plurality of spaced spheroids 34 extending from their inner sides in a manner whereby when the jaws are closed the said spheroids 34 will meet in interlocking engagement.

Figure 2:
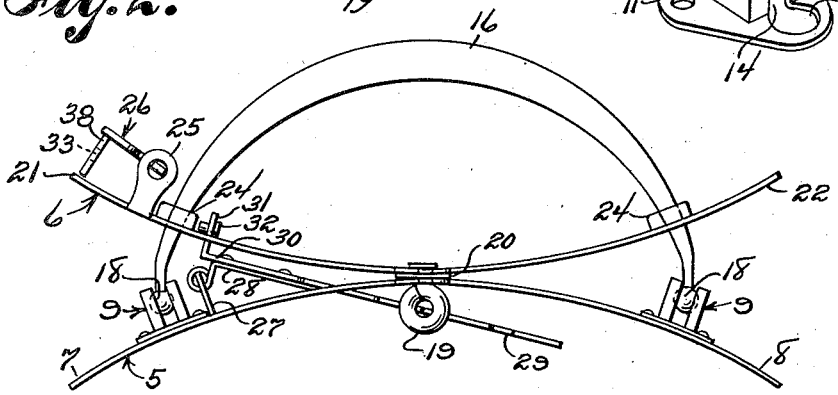
Figure 2 is a side elevation thereof.
Figure 3:
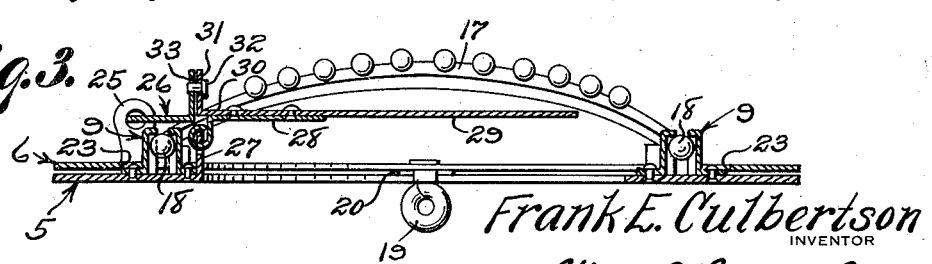
Figure 3 is a vertical sectional view taken on the line 3—3 of Figure 1.

To set the trap the springs 5 and 6 are forced together, as illustrated in Figure 3, and the jaws 16 and 17 spread in the open position and supported by the tabs 24 on the upper spring. The vertically disposed portion of the trigger and the flange 31 of the treadle are moved into parallel relation with each other, and with the pin 32 received within the opening 33. When thus associated the spring arms of the treadle will be brought into flexed relation with the ends of the jaws and the resilient action of the same will materially aid in holding the jaws open and the spring plates 5 and 6 in parallel relation. The resilient action of the arms 37 will also provide the necessary tension required to hold the treadle and trigger in locked relation and to effect a substantially hair trigger release therebetween. When the spring plates 5 and 6 are released, the flanges 24 of the upper spring 9 will support the jaws pending the disengagement of the treadle from the trigger and, upon such disengagement will simultaneously and substantially instantaneously flick the jaws together; the pin 32 will be detachably positioned within the opening 33 so that when a weight is applied to the outer end of the treadle 29, the pin 32 will be easily disengaged from the opening and permit the resilient action of the springs 5 and 6 to force the jaws to a closed position. The sides of the recesses 23 at either end of the spring 6 will exert a positive action on both jaws simultaneously and assure a rapid closing movement of the jaws, and the upward movement of the jaws will pivot the trigger to the position illustrated in Figure 2.

It is to be understood that the form of my invention, herewith shown and described, is to be taken as a preferred example of the same, and that various changes in shape, size and arrangement of parts may be resorted to without departing from the spirit of my invention or the scope of the appended claims.

Having thus described my invention, I claim:

1. An animal trap comprising the combination of superimposed springs centrally connected and with the ends normally sprung apart; jaws pivoted to the lower spring and extending through recesses in the upper spring and adapted to be held in a closed position by engagement with the sides of the recesses; vertically disposed supporting flanges carried by the upper spring at the sides of the said recesses adapted to support the jaws when the ends of the springs are moved toward each other; a trigger pivoted to the upper spring adjacent the pivoted ends of the jaws, said trigger having spring arms adapted to resiliently engage the upper edges of the jaws; and a treadle pivoted to the lower spring and engageable with the trigger, said treadle being held in association with the trigger by the resilient action of the spring arms.

2. In an animal trap the combination of superimposed springs joined at their middle and with the ends thereof normally sprung apart, said upper spring having recesses in its opposite ends and upset flanges at the sides of the recesses; transversely slotted housings secured to the lower spring and positioned to extend through the recesses in the upper spring, arcuated jaws having ends extending through the transverse slot in the housings and terminating in spherically shaped portions of greater diameter than the width of the slots, a trigger pivotally attached to the upper spring adjacent the pivoted ends of the jaws, said trigger having spring arms adapted to resiliently engage the upper edges of the jaws; and a treadle adapted to be releasably connected to the trigger and to be held in association therewith by the resilient action of the said spring arms.

3. In an animal trap including superimposed spring members the improvements comprising transversely slotted housings mounted at opposite ends of the lower member; and arcuate jaws having ends extending through the transverse slots in the housings and terminating in spherically shaped portions of greater diameter than the width of the said slots.

FRANK E. CULBERTSON.